April 14, 1970   J. G. SMYLIE   3,505,870

PRESSURIZED CONTAINER WITH CONTENT INDICATOR

Filed Aug. 7, 1968

INVENTOR
JERRY G. SMYLIE

BY Busser Somuch Harlig

ATTORNEYS

United States Patent Office 3,505,870
Patented Apr. 14, 1970

3,505,870
PRESSURIZED CONTAINER WITH CONTENT INDICATOR
Jerry G. Smylie, Los Banos, Calif., assignor to Avoset Company, Oakland, Calif., a corporation of Delaware
Filed Aug. 7, 1968, Ser. No. 750,894
Int. Cl. G01f 23/02
U.S. Cl. 73—323                                    3 Claims

ABSTRACT OF THE DISCLOSURE

A pressurized container has a window in its bottom wall spaced from the center of the bottom wall and adjacent the side wall of the container. Markings on the exterior of the bottom wall adjacent the window indicate the amount of fluid product in the container when the container is rotated with its axis substantially horizontal to a position where the fluid product shows through a predetermined portion of the window.

BACKGROUND OF THE INVENTION

Pressurized containers such as, for example, aerosol containers are widely used to dispense a wide variety of fluid products. Due to the pressurizing, the containers do not have removable tops and are normally manufactured from metal and hence it is not possible to visually determine the amount of fluid product in the container. Further, is is difficult for the user to estimate the amount of fluid product in the container by noting changes in its weight as the product is used. In accordance with this invention, there is provided means for determining the amount of product in a pressurized container which can be employed with high pressures.

SUMMARY OF THE INVENTION

A substantially cylindrical container, for example, a pressurized container, for dispensing a fluid product and having a side wall, a bottom wall, a dispensing opening, and means to control the dispensing opening, has a window in the bottom wall spaced from the center of the bottom wall and adjacent the side wall of the container. Fixed marking means indicate the amount of fluid product in the container when the container is rotated with its axis substantially horizontal to a position where the fluid product shows through a predetermined portion of the window. Advantageously, the window is of a light transmitting synthetic resin (plastic) such as, for example, vinyl resin such as a transparent or translucent polyvinyl chloride, polystyrene or an acrylic resin such as methyl methacrylate and will preferably have an opening with a maximum dimension in the range of from about 1/4" to 3/8". Preferably, the window will be circular. The window opening and the thickness of the plastic will be selected to prevent blow-out with the pressure employed. Generally, the thickness of the plastic will be in the range of 1/32" to 3/32" and can be secured to the bottom wall by a compatible adhesive such as casein, epoxy or latex based cement. It is preferred to have the markings extend substantially radially from the window with the markings imprinted, stamped or otherwise placed on the bottom wall of the container.

PREFERRED EMBODIMENT

Figure 1:
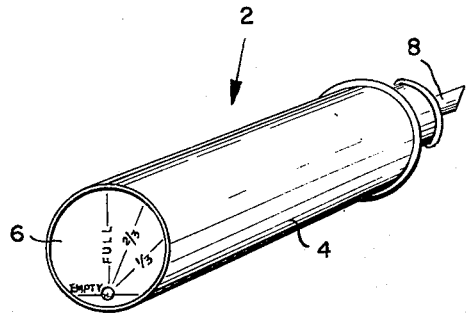
FIGURE 1 is a side perspective view of a pressurized container embodying the invention.
Figure 2:
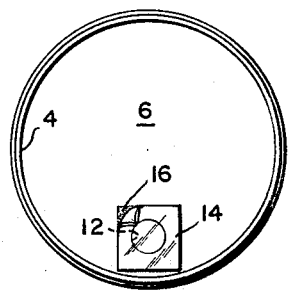
FIGURE 2 is a section through the container of FIGURE 1 looking downwardly at the inner face of the bottom wall of the container.

As shown in FIGURE 1, a cylindrical pressurized container 2 is formed of metal and has a side wall 4, a bottom wall 6 and a dispensing opening valve 8. Container 2 contains a fluid product 10 (FIGURE 3) as well as a gas under pressure (not shown). As thus described, container 2 and its contents are well known to the art being in wide commercial use.

Bottom wall 6 has a small circular opening 12 adjacent side wall 4. A transparent sheet 14 of synthetic resin overlies opening 12 and is secured to the inner face of wall 6 by an adhesive indicated at 16 to form a transparent fluid-proof window in the bottom wall 6 of container 2.

Figure 3:
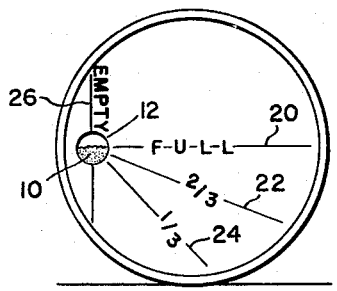
FIGURE 3 is a bottom plan view of the container of FIGURE 1 with a full charge of fluid product and rotated with its axis horizontal to the position where the fluid product shows through half of the bottom window.
Figure 4:
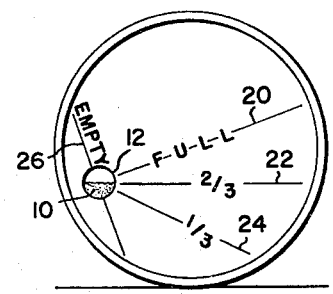
FIGURE 4 is a bottom plan view of the container of FIGURE 1 with the amount of fluid product reduced to two-thirds and rotated with its axis to the position where the product shows through one-half of the bottom window.
Figure 5:
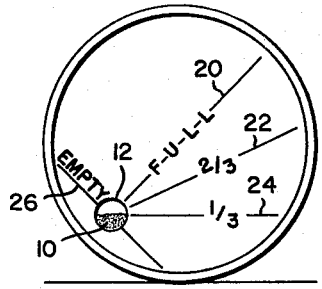
FIGURE 5 is a bottom plan view of the container of FIGURE 1 with the amount of fluid product reduced to one-third and the container rotated with its axis horizontal to a position where the fluid product shows through half of the bottom window.
Figure 6:
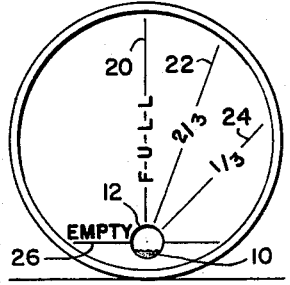
FIGURE 6 is a bottom plan view of the container of FIGURE 1 with the fluid product substantially all discharged and the container rotated with its axis horizontal to the position where the fluid product shows through the bottom window.

On the outer surface of wall 6 there is imprinted by lithography or the like a line 20 accompanied by the word "full," a line 22 accompanied by "two/thirds," a line 24 accompanied by "one/third" and a line 26 accompanied by "empty," all extending radially from opening 12. These lines are calibrated so that when container 2 contains a full charge of fluid product (normally about 50% of the container volume) line 20 is aligned with the top level of product 10 seen through the lower half of opening 12 as illustrated in FIGURE 3. Similarly line 22 is calibrated to line up with a product content of two thirds of the full content as shown in FIGURE 4, line 24 to line up with a level of product equal to one third of the full content as shown in FIGURE 5 and line 26 to line up equal to or above a level of product which no longer provides satisfactory dispensing of the product. In order to determine its content, the container is placed on a horizontal surface or is held horizontally and rotated about its axis until the liquid level can be observed in the middle of the window in which position it can be seen whether the product content is full, two thirds full, one third full, empty or somewhere in between as is readily interpolated visually.

It will be understood the above described embodiment is illustrative and is not intended to be limiting.

What is claimed is:

1. In a substantially cylindrical pressurized container for dispensing a fluid product and having a side wall, a bottom wall, a dispensing opening and means to control the dispensing opening, a window in the bottom wall spaced from the center of the bottom wall and adjacent the side wall, and fixed marking means to indicate the amount of fluid product in the container when the container is rotated with its axis substantially horizontal to a position where the fluid product shows through a predetermined portion of the window.

2. The container of claim 1 in which the window is of synthetic resin.

3. The container of claim 1 in which the window comprises a synthetic resin sheet overlying an opening in the bottom wall of the container.

References Cited

UNITED STATES PATENTS

| | | | |
|---|---|---|---|
| 1,658,625 | 2/1928 | Ainsworth et al. | 73—323 X |
| 1,949,098 | 2/1934 | Beeker | 222—156 X |
| 2,112,924 | 4/1938 | Molloy et al. | |
| 2,533,578 | 12/1950 | Gomersall | 73—334 |
| 3,339,413 | 9/1967 | Taylor et al. | 116—118 X |

FOREIGN PATENTS 1,224,800   6/1960   France.

LOUIS R. PRINCE, Primary Examiner

D. M. YASICH, Assistant Examiner

U.S. Cl. X.R.

222—158